(12) United States Patent
Amante et al.

(10) Patent No.: US 11,548,630 B2
(45) Date of Patent: Jan. 10, 2023

(54) CONVERSION SPINDLE WITH DUAL DUCTED TILTROTORS

(71) Applicant: Bell Textron Inc., Fort Worth, TX (US)

(72) Inventors: William Anthony Amante, Grapevine, TX (US); Karl Schroeder, Southlake, TX (US); Joseph Richard Carpenter, Jr., Kennedale, TX (US); Timothy Brian Carr, Fort Worth, TX (US)

(73) Assignee: Textron Innovations inc., Providence, RI (US)

( * ) Notice: Subject to any disclaimer, the term of this patent is extended or adjusted under 35 U.S.C. 154(b) by 145 days.

(21) Appl. No.: 16/732,065

(22) Filed: Dec. 31, 2019

(65) Prior Publication Data

US 2021/0197964 A1    Jul. 1, 2021

(51) Int. Cl.
*B64C 29/00* (2006.01)
*F16C 3/02* (2006.01)

(52) U.S. Cl.
CPC ...... *B64C 29/0033* (2013.01); *B64C 29/0091* (2013.01); *F16C 3/02* (2013.01); *F16C 2204/20* (2013.01); *F16C 2226/60* (2013.01); *F16C 2326/43* (2013.01)

(58) Field of Classification Search
CPC . B64C 29/0033; B64C 29/0091; B64C 27/26; B64C 27/28
See application file for complete search history.

(56) References Cited

U.S. PATENT DOCUMENTS

| | | | | |
|---|---|---|---|---|
| 1,928,578 | A * | 9/1933 | Turrell | B64C 29/0033 244/23 R |
| 3,052,430 | A * | 9/1962 | Reichert | B64C 29/0033 244/110 B |
| 3,567,157 | A * | 3/1971 | Dancik | B64C 29/0033 244/7 C |
| 4,880,071 | A * | 11/1989 | Tracy | B64C 29/0033 180/117 |
| 5,096,140 | A * | 3/1992 | Dornier, Jr. | B64C 29/0033 244/12.4 |
| 7,815,145 | B2 * | 10/2010 | Beardsley | B64D 27/26 244/54 |
| 9,868,541 | B2 * | 1/2018 | Kooiman | B64C 27/22 |

* cited by examiner

*Primary Examiner* — Tien Q Dinh
*Assistant Examiner* — William L Gmoser
(74) *Attorney, Agent, or Firm* — Lightfoot & Alford PLLC

(57) ABSTRACT

A ducted-rotor aircraft includes a fuselage, first and second ducts, and a spindle that is coupled to the fuselage. Each duct includes a rotor having a plurality of blades. The first and second ducts are coupled to opposed ends of the spindle. The spindle is rotatably coupled to the fuselage with first and second bearings. The first bearing is configured to react to radial loads and the second bearing is configured to react to both radial and axial loads. The spindle includes a shaft, first and second fittings secured to opposed ends of the shaft, and first and second attachment interfaces that are attachable to the first and second ducts. The attachment interfaces may be integral with the fittings. Alternatively, the fittings may be configured to be secured to the attachment interfaces with fasteners.

18 Claims, 7 Drawing Sheets

CONVERSION SPINDLE WITH DUAL DUCTED TILTROTORS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Ducted-rotor aircraft have at least one ducted rotor for providing lift and propulsion forces. A ducted rotor for such an aircraft typically has internal structure that supports a motor of the aircraft, and an aerodynamic exterior skin. One or more ducted rotors may be configured to be individually coupled to a fuselage of such an aircraft.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A conversion spindle that is couplable to dual ducted tiltrotors is disclosed herein for use in ducted-rotor aircraft. It is desirable to minimize the number of separate components that make up the structure of a ducted-rotor aircraft, not only to limit the weight of the aircraft, but further to limit the number of joints that might be stressed during operation of the aircraft.

Figure 1:
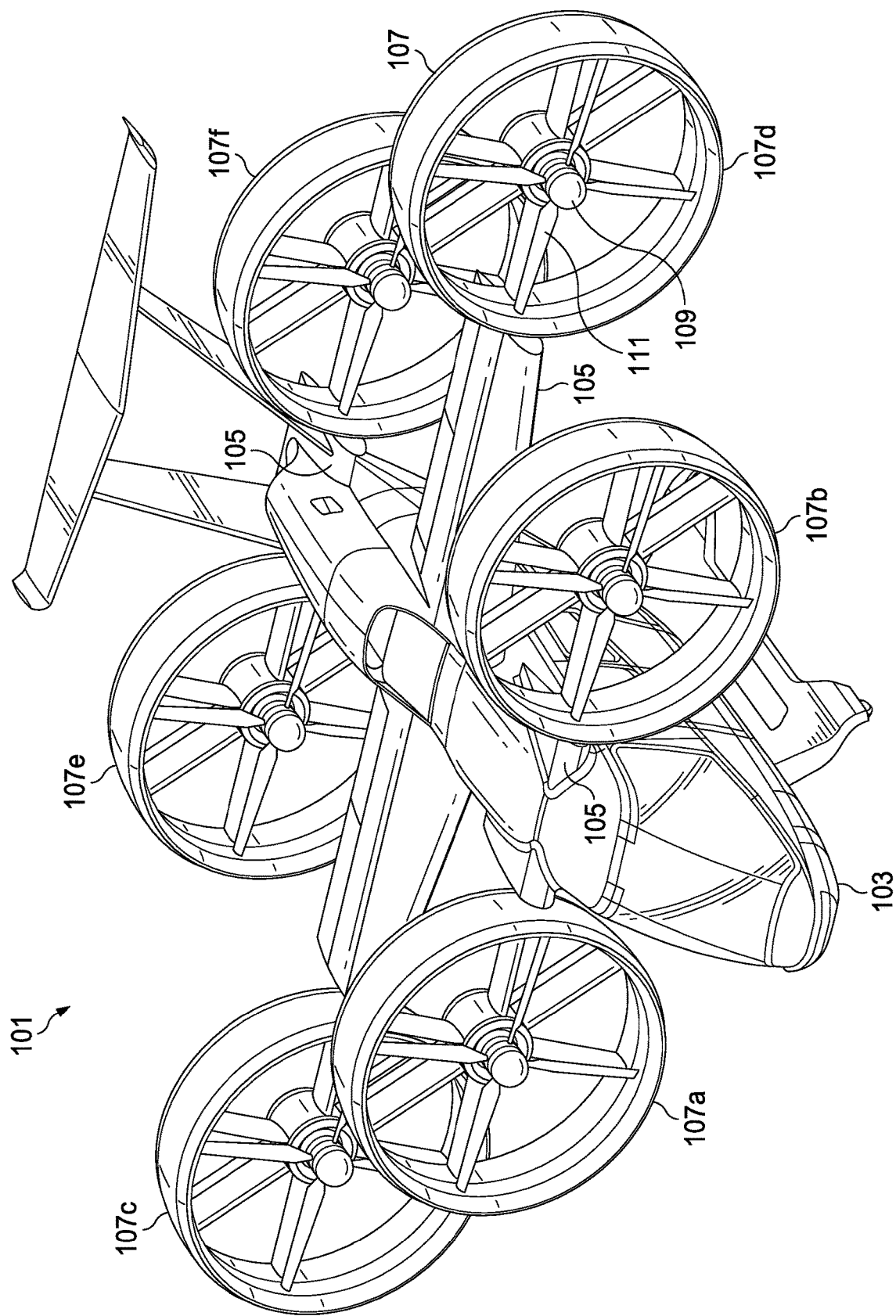
FIG. 1 is an oblique view of an aircraft with ducted rotors.

FIG. 1 is an oblique view of a ducted-rotor aircraft 101. Aircraft 101 comprises a fuselage 103 with a plurality of fixed wings 105 extending therefrom and a plurality of pivotable ducts 107. As shown, a duct 107 is located at an end of each wing 105. Each duct 107 houses a power plant for driving an attached rotor 109 in rotation. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in airplane mode, which allows for high-speed forward flight. Ducts 107 are repositionable to convert aircraft 101 into helicopter mode (not shown), which allows for vertical takeoff and landing, hovering, and low-speed directional movement. In this embodiment, aircraft 101 is configured with six ducts 107, including two ducts 107a and 107b that form a forward pair of ducts, two ducts 107c and 107d that form a central pair of ducts, and two ducts 107e and 107f that form an aft pair of ducts. It should be appreciated that aircraft 101 is not limited to the illustrated configuration having six ducts 107. For example, aircraft 101 may alternatively be implemented with more or fewer ducts 107.

Figure 2:
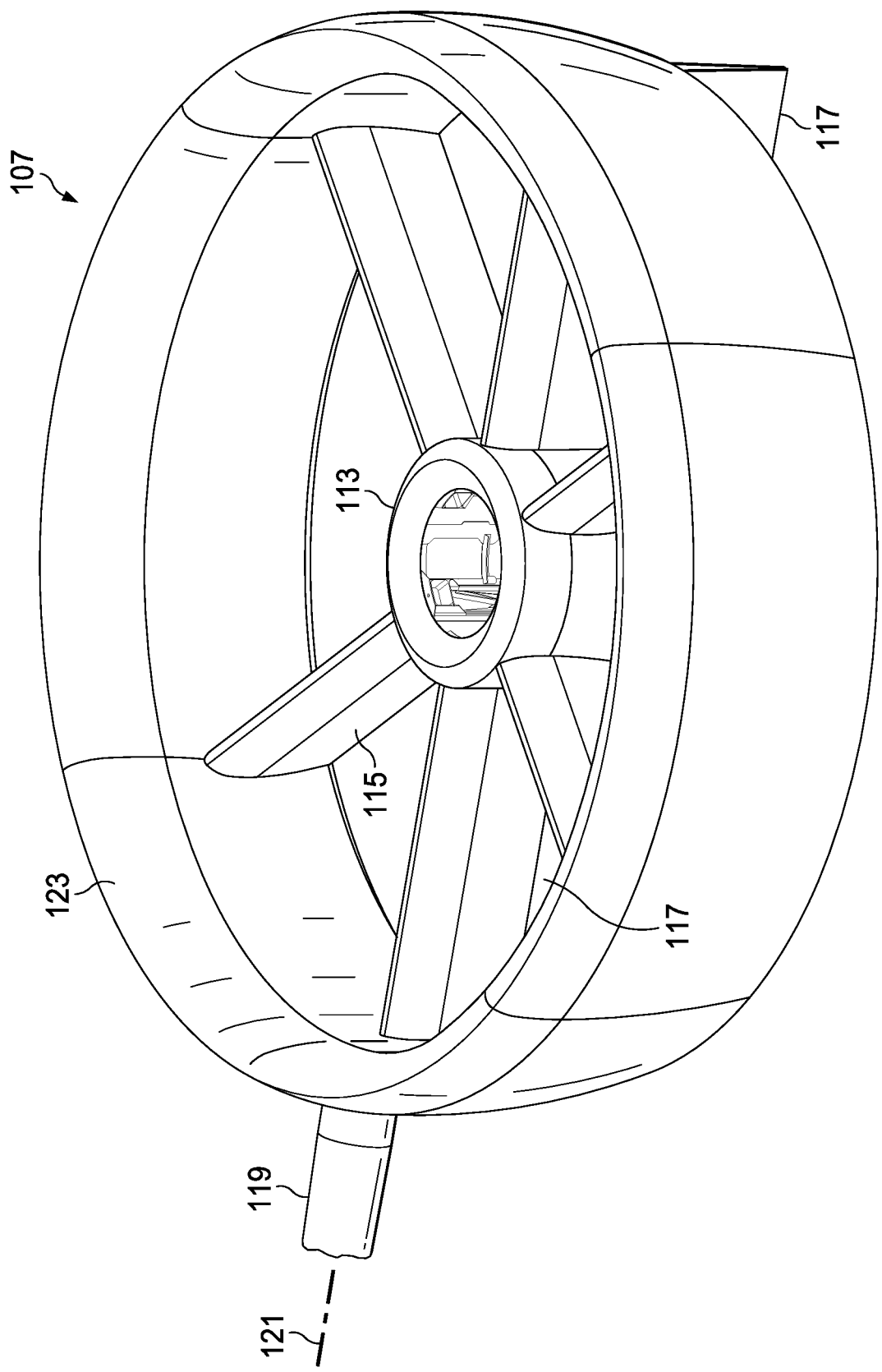
FIG. 2 is an oblique view of a duct of the aircraft depicted in FIG. 1.

FIG. 2 is an oblique view of a duct 107 of aircraft 101. Duct 107 is depicted in FIG. 2 without rotor 109. Duct 107 includes a central hub 113 that is configured to receive a rotor 109 and/or other components. Duct 107 further includes a plurality of stators 115 that extend outwardly from the hub 113. Duct 107 includes six stators 115 that extend radially outward from hub 113. As shown, stators 115 are unequally spaced about hub 113. It should be appreciated that duct 107 may be alternatively configured with more or fewer stators 115. It should further be appreciated that duct 107 may be alternatively configured with different spacing of stators 115 about hub 113.

Duct 107 further includes a pair of control vanes 117 that are pivotally attached to respective stators 115. Each pair of control vanes 117 is pivotable about a respective vane axis. Control vanes 117 may be rotated to facilitate yaw control, changes of direction, turning, etc. during flight of aircraft 101. In this embodiment, each duct 107 is configured to be couplable to a spindle, such as spindle 119, that is in turn couplable to fuselage 103 of aircraft 101. Spindle 119 facilitates pivotable attachment of one or more ducts 107 to a corresponding wing 105 of aircraft 101. Spindle 119 is pivotable about a spindle axis 121, for example when duct 107 is rotated to convert aircraft 101 between helicopter mode and airplane mode. Duct 107 may include one or more sections of cowling 123 that form an aerodynamic outer skin of duct 107, and that define an opening that extends through duct 107. As shown, hub 113 is at least partially disposed within the opening.

Figure 3:
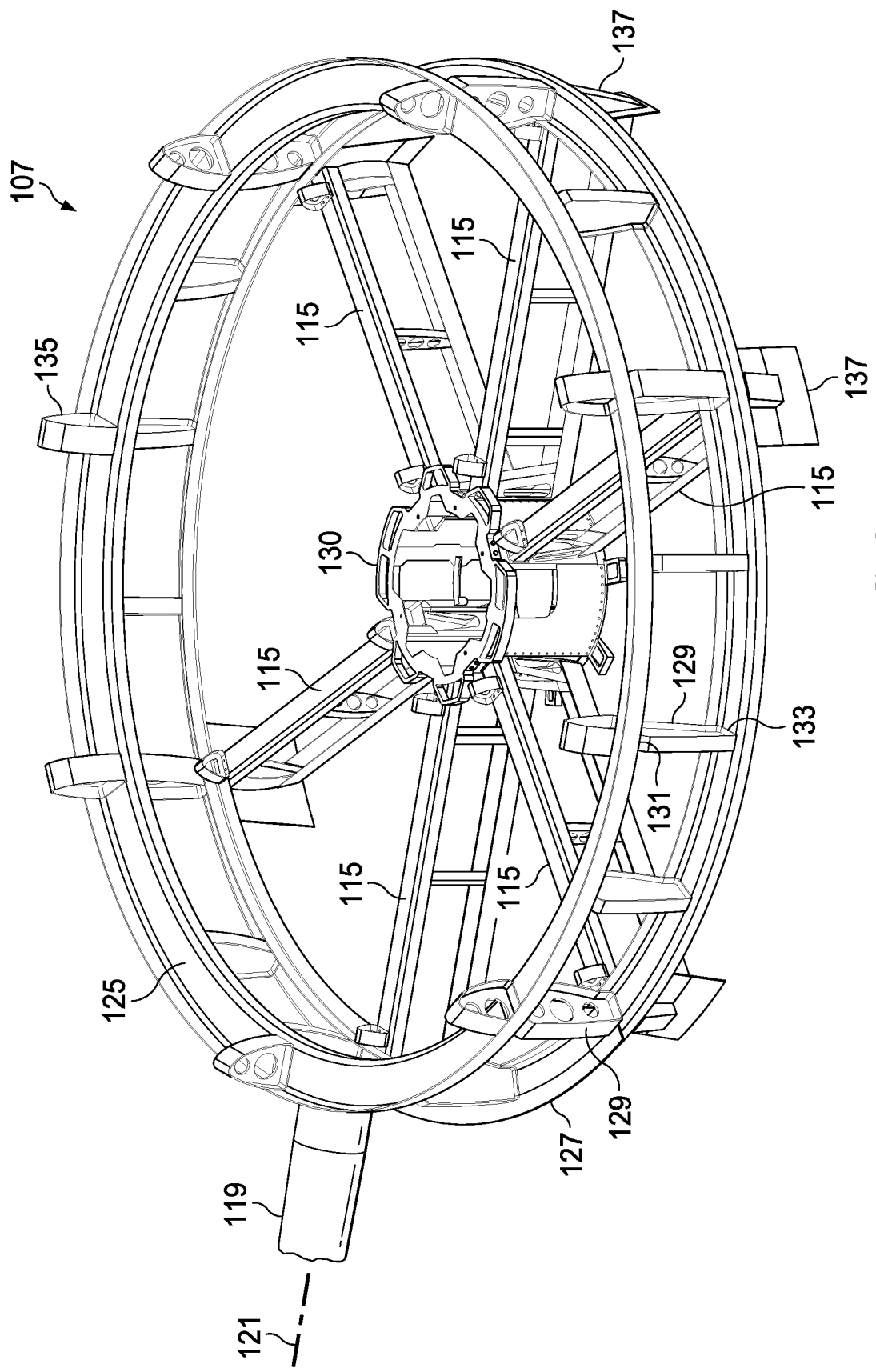
FIG. 3 is an oblique view of the duct depicted in FIG. 2, with an outer skin of the duct removed to illustrate internal components of the duct.

FIG. 3 is an oblique view of duct 107 with cowling 123 removed to illustrate inner components of duct 107, and with no control vanes 117 attached. Duct 107 has a structural framework comprised of structural members. Included among structural members of duct 107 are stators 115, spindle 119, an annular forward spar 125, an annular aft spar 127, a plurality of ribs 129, and an inner hub assembly 130. Hub assembly 130 is configured for the attachment of a motor (not shown) thereto that drives rotor 109, and configured to facilitate the attachment of other components of duct 107 thereto, such as stators 115, mechanisms for causing control vanes 117 to rotate, and so on.

Each rib 129 defines an upper end 131 and an opposed lower end 133. The upper end 131 of each rib 129 is configured to attach to forward spar 125, and the lower end 133 of each rib 129 is configured to attach to aft spar 127. As shown, ribs 129 may be configured with differing geometries. For example, respective ribs 129 positioned above the ends of stators 115 may be wider than the remaining ribs 129 and may define one or more apertures that extend therethrough. It should be appreciated that duct 107 is not limited to the illustrated configuration of ribs 129. For example, duct 107 may be implemented with more or fewer ribs and/or with ribs having the same or different geometries as compared to ribs 129.

In this embodiment, the structural members of duct 107 further include braces 135 and stator brackets 137. Braces 135 are attached to forward spar 125 and are configured to support corresponding portions of cowling 123. As shown, braces 135 are spaced apart around forward spar 125, attached to forward spar 125 at locations above every other rib 129. Stator brackets 137 are attached to aft spar 127 at locations where stators 115 intersect aft spar 127. Stator brackets 137 are configured to facilitate attachment of respective ends of stators 115 to aft spar 127. As shown, stator brackets 137 may be configured with differing geometries. In this embodiment, each stator bracket 137 is fabricated as a single-piece component.

One or both of forward spar 125 and aft spar 127 may be constructed of composite material. In the instant disclosure, composite material preferably refers to plies of a fiber-reinforced plastic (FRP) composition that includes filament fibers, such as carbon fibers for example, embedded in a thermoset polymer matrix material such as a thermoplastic resin. Preferably the fibers within the plies are woven and the plies are pre-impregnated with resin. To illustrate, forward spar 125 and aft spar 127 may be constructed from one or more layered plies of carbon-fiber-reinforced plastic (CFRP). It should be appreciated that duct 107 is not limited to an implementation having two spars such as forward spar 125 and aft spar 127. For example, duct 107 may be alternatively implemented with more or fewer spars.

When ducts 107 are positioned as shown in FIG. 1 with blades 111 of rotors 109 rotating, air will move into ducts 107 past forward spars 125 as rotors 109 generate thrust that causes aircraft 101 to move in a forward direction. As air moves through ducts 107 while blades 111 of rotors 109 are rotating, the air will move past aft spars 127 and be exhausted over control vanes 117 and away from ducts 107, for example in an aft direction as aircraft 101 moves in a forward direction. In this regard, control vanes 117 are mounted aft of blades 111 of rotors 109.

Figure 4:
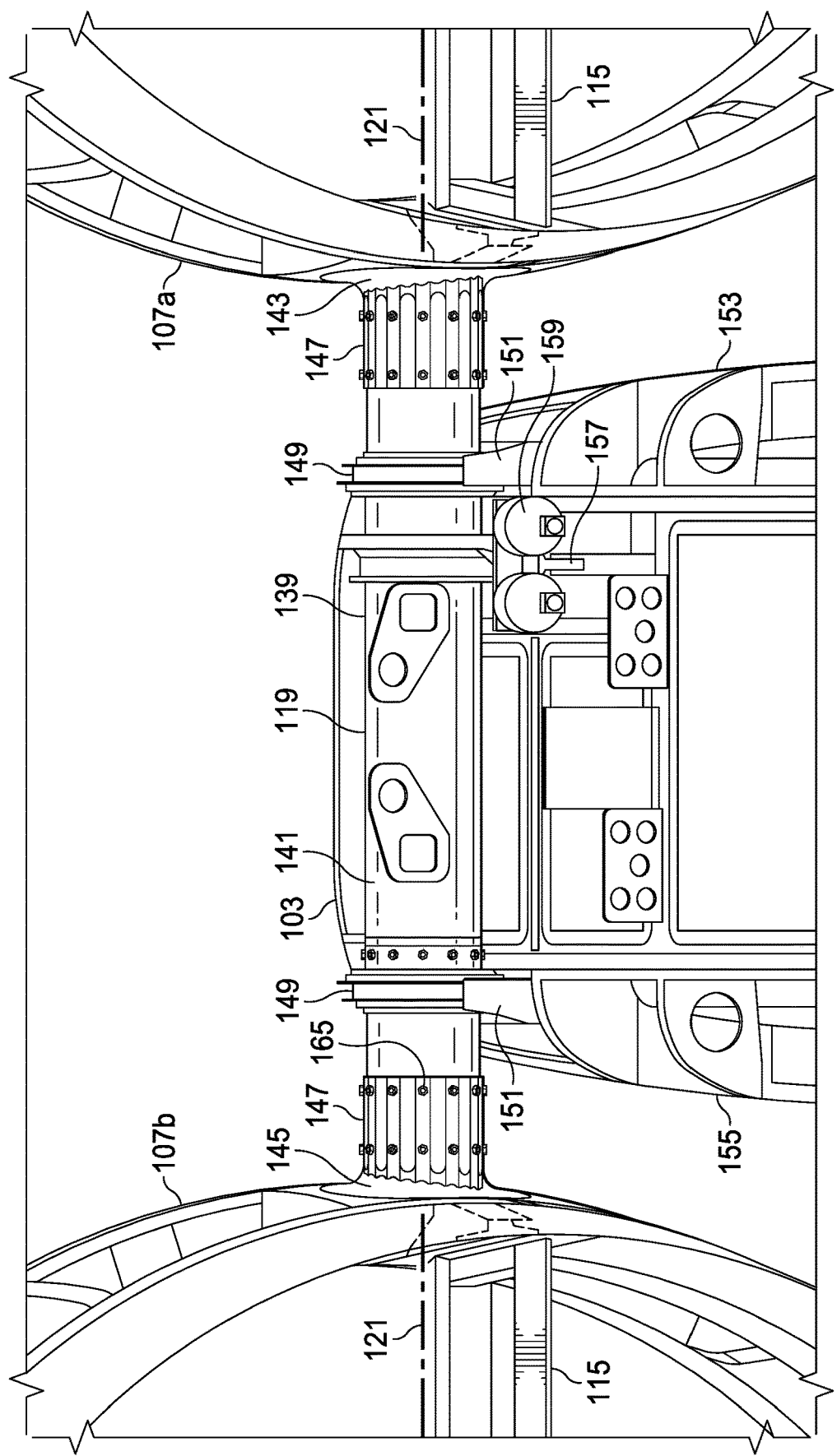
FIG. 4 is an oblique view of a portion of the aircraft depicted in FIG. 1, with an exterior skin of the aircraft removed to illustrate a spindle of the aircraft.

FIG. 4 is an oblique view of a portion of aircraft 101, with an aerodynamic exterior skin of fuselage 103 removed to illustrate a duct assembly 139 that is configured to rotatably couple ducts 107a and 107b to fuselage 103. As shown, duct assembly 139 includes duct 107a, duct 107b, and spindle 119. Spindle 119 is configured to support ducts 107a and 107b. As shown, ducts 107a and 107b are coupled to opposed ends of spindle 119. Duct 107a may be referred to as a first duct 107 of duct assembly 139 and duct 107b may be referred to as a second duct 107 of duct assembly 139.

Spindle 119 includes a shaft 141 that is elongate from a first end 143 (not visible) to a second end 145 (not visible). As shown, shaft 141 of spindle 119 is cylindrical. It should be appreciated however, that shaft 141 is not limited to the illustrated cylindrical cross-section, and that shaft 141 may be alternatively implemented with any other suitable geometry. Shaft 141 may be fabricated from aluminum or any other suitable material. Spindle 119 further includes two fittings 147 that are configured to be disposed onto, and secured to, respective ends of shaft 141. As shown, a first fitting 147 is disposed onto and secured to first end 143 of shaft 141 and a second fitting 147 is disposed onto and secured to second end 145 of shaft 141.

Spindle 119 further includes two bearings 149 that are mounted on shaft 141. Bearings 149 are configured to rotatably couple spindle 119 to fuselage 103 of aircraft 101. In this embodiment, fuselage 103 includes a pair of cradles 151 that are configured to receive bearings 149 therein. As shown, a first cradle 151 is located on top of fuselage 103 near a first side 153 thereof and a second cradle 151 is located on top of fuselage 103 near an opposed second side 155 thereof. A first one of bearings 149 is configured to react to radial loads, and a second one of bearings 149 is configured to react to both radial and axial loads.

Spindle 119 further includes a mount 157 that is configured to facilitate operably coupling shaft 141 to a mechanism that can cause spindle 119 to rotate about spindle axis 121. In this embodiment, mount 157 is configured to be coupled to a linear actuator 159 that is mounted to fuselage 103. When operated, linear actuator 159 causes spindle 119 to rotate about spindle axis 121, for example during conversion of aircraft 101 between airplane mode and helicopter mode. In this regard, linear actuator 159 may be referred to as a conversion actuator. When linear actuator 159 causes spindle 119 to rotate, ducts 107a and 107b exhibit equal rotational displacement relative to each other about spindle axis 121.

Figure 5A:
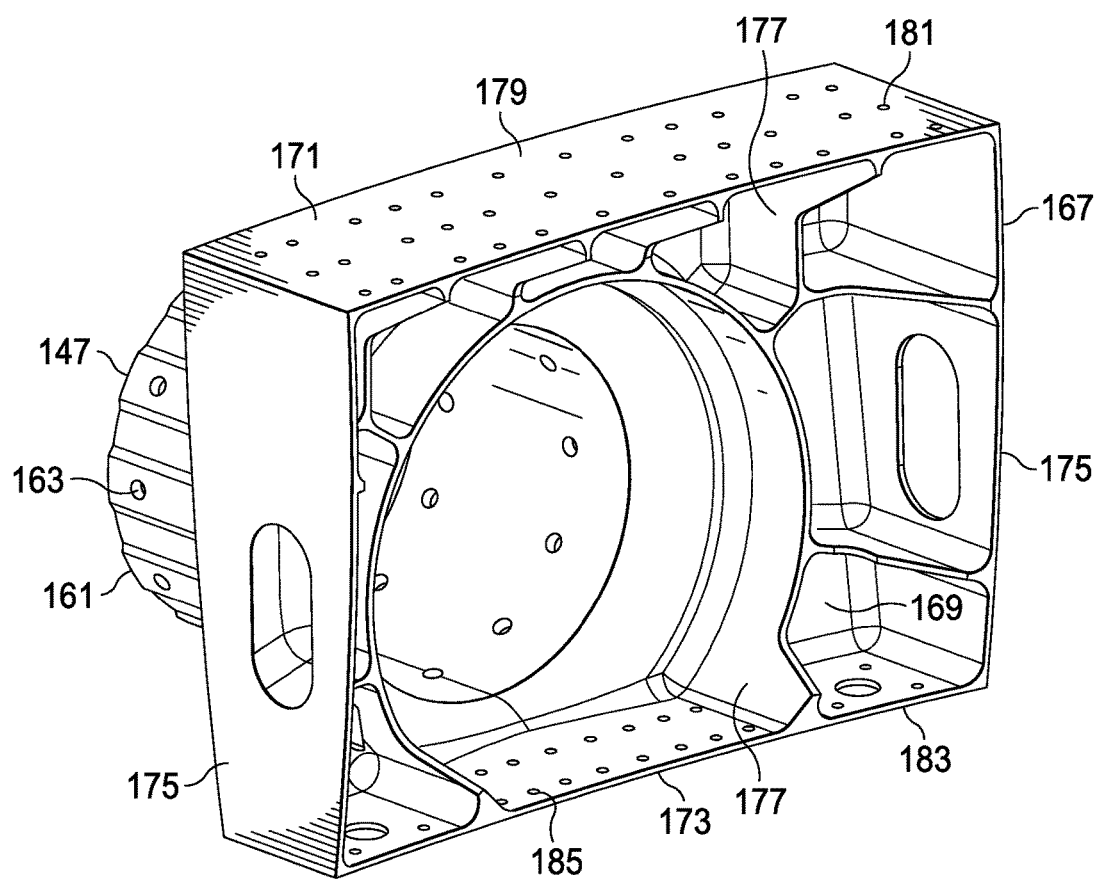
FIG. 5A is an oblique view of a fitting component of the spindle depicted in FIG. 4.
Figure 5B:
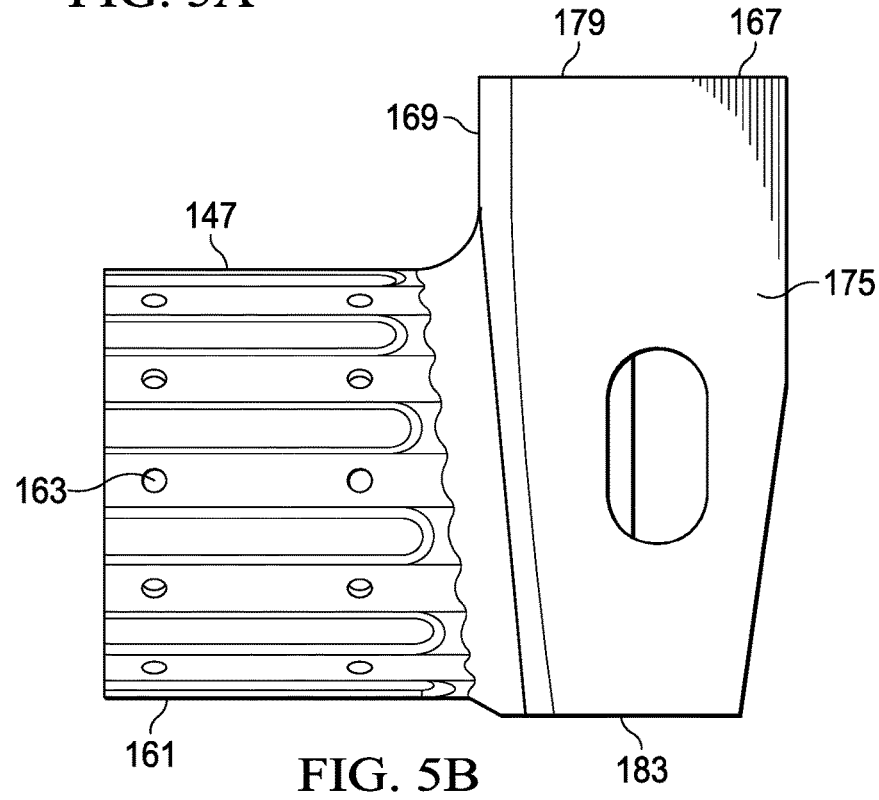
FIG. 5B is a side view of the fitting depicted in FIG. 5A.

FIG. 5A is an oblique view of fitting 147 and FIG. 5B is a side view of fitting 147. As shown, fitting 147 has a tubular body 161 that is configured to be disposed onto an end of shaft 141, such as first end 143 or second end 145. Body 161 may be configured to be mechanically fastened to shaft 141. For example, in this embodiment body 161 has a plurality of apertures 163 and a corresponding end of shaft 141 has a plurality of apertures (not shown) that extend therethrough. The respective pluralities of apertures of fitting 147 and shaft 141 may be aligned with one another such that fasteners, for instance bolts 165, may be installed into the pluralities of apertures to removably secure fitting 147 to shaft 141. Fitting 147 may be fabricated from aluminum or any other suitable material.

Spindle 119 further includes first and second attachment interfaces 167 that are configured to be attachable to ducts 107 of aircraft 101, such as ducts 107a and 107b. In this regard, attachment interfaces 167 facilitate attachment of ducts 107 to spindle 119 of duct assembly 139. In this embodiment, attachment interfaces 167 are integral with fittings 147. Attachment interface 167 may be fabricated from aluminum or any other suitable material.

As shown, attachment interface 167 includes a rear wall 169 from which body 161 of fitting 147 extends. Attachment interface 167 further includes an upper wall 171, a lower wall 173 that is spaced from upper wall 171, and opposed side walls 175 that extend from upper wall 171 to lower wall 173. Upper wall 171, lower wall 173, and side walls 175 are sized such that attachment interface 167 defines a rectangular cross-section, taken perpendicular to spindle axis 121, that is larger than the cross-sectional area of shaft 141 at first end 143 or second end 145. Attachment interface 167 further includes a plurality of cross members 177 that extend between and interconnect rear wall 169, upper wall 171, lower wall 173, and side walls 175. Cross members 177 are configured to provide structural support to attachment interface 167.

Figure 6:
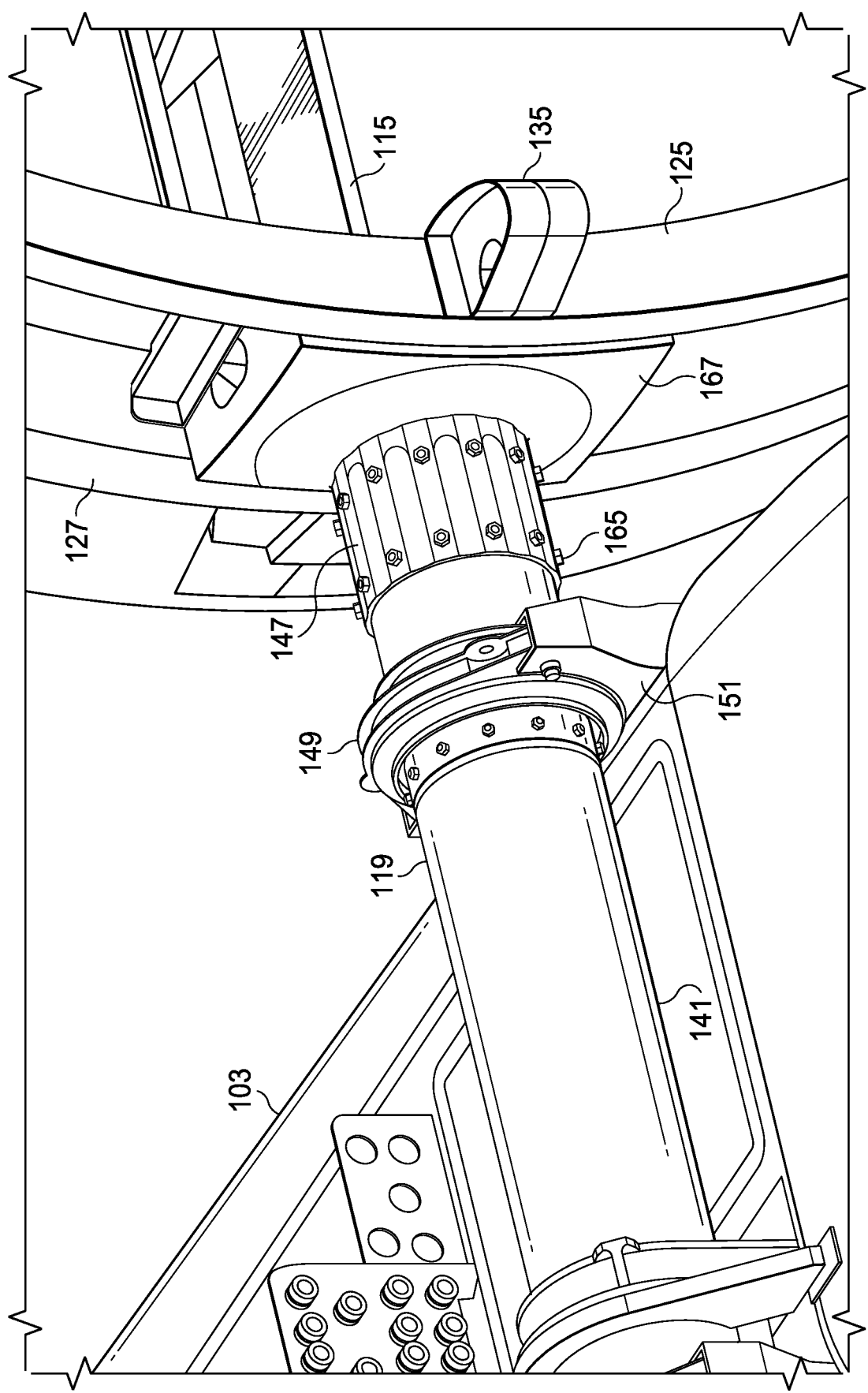
FIG. 6 is an oblique view of a portion of the duct depicted in FIG. 3.

Attachment interface 167 is configured to facilitate attachment of forward spar 125 and aft spar 127 to spindle 119. In this embodiment, upper wall 171 and lower wall 173 are arc-shaped to conform to respective portions of the geometries of forward spar 125 and aft spar 127, respectively. Upper wall 171 defines a planar outer surface 179 that is configured to abut a corresponding portion of a lower surface of forward spar 125. Upper wall 171 further includes a plurality of apertures 181 that extend therethrough and that are configured to receive fasteners (e.g., bolts, rivets, or the like) to attach forward spar 125 to attachment interface 167, and thus to spindle 119, as shown in FIG. 6. Lower wall 173 defines a planar outer surface 183 that is configured to abut a corresponding portion of an upper surface of aft spar 127. Lower wall 173 further defines a plurality of apertures 185 that extend therethrough and that are configured to receive fasteners (e.g., bolts, rivets, or the like) to attach aft spar 127 to attachment interface 167, and thus to spindle 119, as shown in FIG. 6. Outer surface 179 of upper wall 171 is spaced from outer surface 183 of lower wall 173 through a distance that is the same as that of the spacing between respective outer surfaces of upper ends 131 and lower ends 133 of ribs 129, such that forward spar 125 is spaced uniformly from aft spar 127 about their respective circumferences when forward spar 125 and aft spar 127 are attached to spindle 119.

It should be appreciated that attachment interface 167 is not limited to the configuration illustrated and described herein. For example, upper wall 171 and lower wall 173 are not limited to the illustrated planar, arc-shaped geometry, and may be alternatively configured with other suitable geometries to facilitate attachment of forward and aft spars 125, 127, respectively, to spindle 119. Furthermore, attachment interface 167 may be alternatively configured to facilitate attachment of one or more other components of duct 107, in addition to or in lieu of one or both of forward spar 125 and aft spar 127, to spindle 119.

Figure 7:
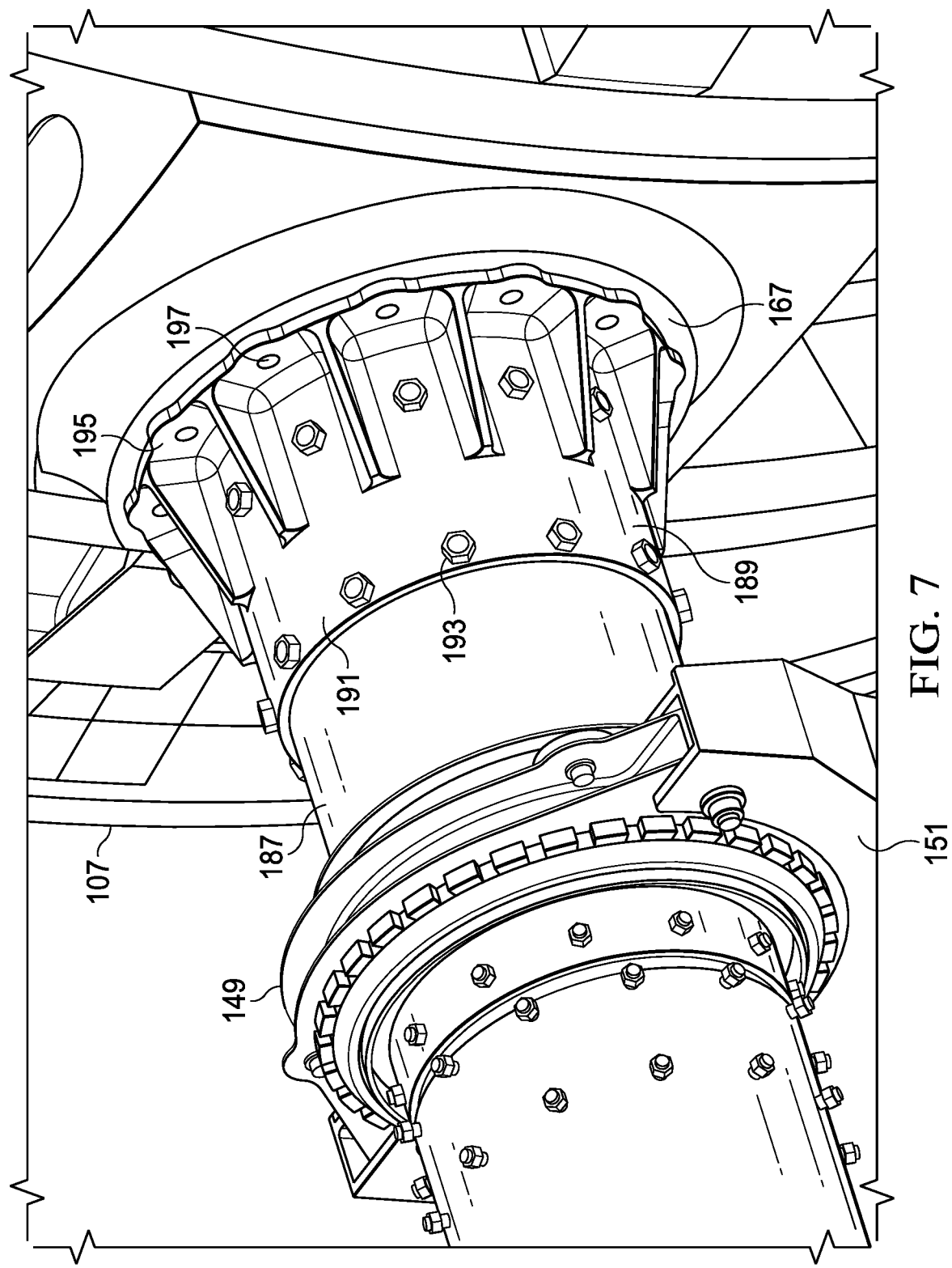
FIG. 7 is an oblique view of an alternative spindle that may be implemented with the aircraft depicted in FIG. 1.

FIG. 7 is an oblique view of an alternative spindle 187 that may be implemented with aircraft 101, for example in lieu of spindle 119. Similarly to spindle 119, spindle 187 includes shaft 141 and two bearings 149. But in contrast to spindle 119, spindle 187 includes two fittings 189 that are configured to be disposed onto, and secured to, respective ends of shaft 141.

As shown, fitting 189 has a tubular body 191 that is configured to be disposed onto an end of shaft 141, such as first end 143 or second end 145. Body 191 may be configured to be mechanically fastened to shaft 141. For example, body 191 has a plurality of apertures (not shown) and a corresponding end of shaft 141 has a plurality of apertures (not shown) that extend therethrough. The pluralities of apertures of fitting 189 and shaft 141 may be aligned with one another such that fasteners, for instance bolts 193, may be installed into the pluralities of apertures to removably secure fitting 189 to shaft 141. Fitting 189 defines a circumferential flange 195 at an end thereof. Flange 195 has a plurality of apertures 197 that extend therethrough. Attachment interface 167 is alternatively configured to facilitate attachment of fitting 189 thereto. In this embodiment, attachment interface 167 is provided as a discrete component that includes a plurality of apertures (not shown) that extend therethrough and that are arranged in a pattern that matches that of apertures 197 of flange 195. Fitting 189 is configured to be secured to attachment interface 167 with fasteners, such as bolts, received in the respective pluralities of apertures in flange 195 and attachment interface 167. Fitting 189 may be fabricated from aluminum or any other suitable material.

It should be appreciated that spindle 119 is not limited to use in coupling ducts 107a and 107b to fuselage 103. For example, in addition to or in lieu of coupling ducts 107a and 107b to fuselage 103 with a first spindle 119, aircraft 101 may include a second spindle 119 that couples ducts 107e and 107f to fuselage 103. In preferred embodiments of aircraft 101, ducts 107c and 107d are each rotatably coupled to fuselage 103 with respective discrete spindles (not shown).

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A ducted-rotor aircraft comprising:
a fuselage;
a spindle that is coupled to the fuselage; and
first and second ducts that are coupled to the spindle, each duct including a rotor that is disposed in an opening that extends through the duct, each rotor having a plurality of blades;
wherein the first and second ducts define first and second interior duct spaces, respectively, that are configured to receive airflow therethrough and wherein no portion of the spindle extends into either of the first and second interior duct spaces;
wherein the spindle comprises:
a shaft that extends from a first end to an opposed second end;

first and second fittings that are configured to be disposed onto, and secured to, the first and second ends of the shaft; and first and second attachment interfaces that are configured to be attachable to the first and second ducts, respectively; and wherein the first attachment interface is disposed within the duct, and between an internal fore spar of the first duct and an internal aft spar of the first duct.

2. The ducted-rotor aircraft of claim 1, wherein the first and second attachment interfaces comprise an open box shape.

3. The ducted-rotor aircraft of claim 1, wherein the spindle is coupled to the fuselage such that the spindle is rotatable about a spindle axis that extends therethrough, and wherein the first and second ducts exhibit equal rotational displacement when the spindle is rotated about the spindle axis.

4. The ducted-rotor aircraft of claim 3, further comprising:

first and second bearings that rotatably couple the spindle to the fuselage, wherein the first bearing is coupled to the fuselage proximate to the first duct and the second bearing is coupled to the fuselage proximate to the second duct.

5. The ducted-rotor aircraft of claim 4, wherein the first bearing is configured to react to radial loads and the second bearing is configured to react to both radial and axial loads.

6. The ducted-rotor aircraft of claim 3, further comprising:

a conversion actuator that is coupled to the fuselage and the spindle, the conversion actuator operable to cause the spindle to rotate about the spindle axis.

7. The ducted-rotor aircraft of claim 1, wherein the first and second attachment interfaces are integral with the first and second fittings, respectively.

8. The ducted-rotor aircraft of claim 1, wherein the first and second fittings are configured to be secured to the first and second attachment interfaces with fasteners.

9. A duct assembly for a ducted-rotor aircraft, the duct assembly comprising:

first and second ducts, each duct including a rotor that is disposed in an opening that extends through the duct, the rotor having a plurality of blades; and a spindle that is configured to support the first and second ducts, wherein the first and second ducts are coupled to the spindle;

wherein no portion of the spindle extends into either the opening of either of the first and second ducts;

wherein the spindle comprises:

a shaft that extends from a first end to an opposed second end;

first and second fittings that are configured to be disposed onto, and secured to, the first and second ends of the shaft; and first and second attachment interfaces that are configured to be attachable to the first and second ducts, respectively; and wherein the first attachment interface is disposed within the duct, and between an internal fore spar of the first duct and an internal aft spar of the first duct.

10. The duct assembly of claim 9, wherein the first attachment interface comprises an open box shape.

11. The duct assembly of claim 9, wherein the first and second attachment interfaces are integral with the first and second fittings, respectively.

12. The duct assembly of claim 9, wherein the first and second fittings are configured to be secured to the first and second attachment interfaces with fasteners.

13. The duct assembly of claim 10, wherein each of the attachment interfaces comprises first and second planar surfaces that are spaced from each other, and wherein the fore spar and the aft spar are annular and are configured to be attached to the respective first and second planar surfaces of the first attachment interface.

14. The duct assembly of claim 9, further comprising:

first and second bearings that are mounted on the spindle and that are configured to rotatably couple the spindle to a fuselage of the aircraft, wherein the first bearing is configured to react to radial loads and the second bearing is configured to react to both radial and axial loads.

15. A spindle for a ducted-rotor aircraft, the spindle comprising:

a shaft that extends from a first end to an opposed second end;

first and second fittings that are configured to be disposed onto, and secured to, the first and second ends of the shaft; and first and second bearings that are mounted on the shaft and that are configured to rotatably couple the spindle to a fuselage of the aircraft, wherein the first bearing is configured to react to radial loads and the second bearing is configured to react to both radial and axial loads;

wherein each of the first and second fittings includes a flange that is configured to be secured to a respective duct of the aircraft, wherein the flange is disposed within the duct, and between an internal fore annular spar of the first duct and an internal aft annular spar of the first duct, wherein each duct defines an interior space configured to receive airflow therethrough, and wherein no portion of the flanges are disposed in the interior spaces of the ducts.

16. The spindle of claim 15, further comprising:

first and second attachment interfaces that are configured to be attachable to respective first and second ducts of the aircraft, wherein the first and second attachment interfaces comprise an open box shape.

17. The spindle of claim 16, wherein the first and second attachment interfaces are integral with the first and second fittings, respectively.

18. The spindle of claim 16, wherein the first and second attachment interfaces are secured to the first and second fittings, respectively, with fasteners.

* * * * *